C. E. WHEELER.
Assignor to J. BOYLE.
Striped Awning or Tent Cloth.
No. 8,431. Reissued Sept. 24, 1878.
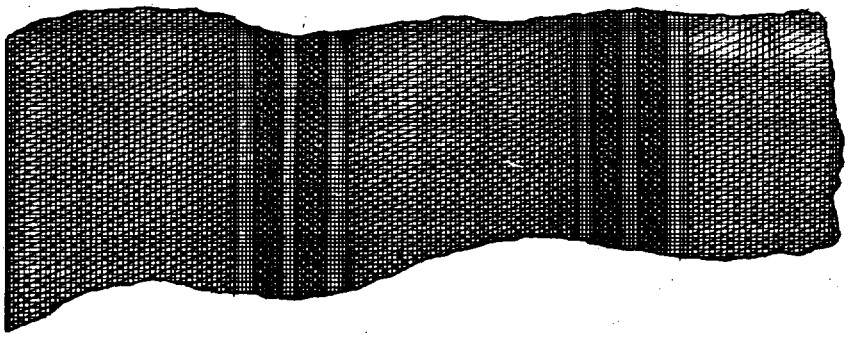
Attest:
Geo. T. Smallwood Jr.
Walter Allen
Inventor:
Charles E. Wheeler
by Knight Bros
Attys

UNITED STATES PATENT OFFICE.

CHARLES E. WHEELER, OF BOSTON, MASSACHUSETTS, ASSIGNOR TO JOHN BOYLE, OF NEW YORK, N. Y.

IMPROVEMENT IN STRIPED AWNING OR TENT CLOTH.

Specification forming part of Letters Patent No. 138,773, dated May 13, 1873; Reissue No. 8,431, dated September 24, 1878; application filed August 24, 1878.

DIVISION B.

*To all whom it may concern:*

Be it known that I, CHARLES E. WHEELER, of Boston, in the county of Suffolk and State of Massachusetts, have invented a new and Improved Manufacture of Striped Cloth for Awnings, of which the following is a specification:

The subject of my invention is a new manufacture of awning or tent cloth, striped in oil-color, so applied that it permeates the fabric completely and with perfect uniformity from end to end of the stripes.

Oil-colors are superior to dies for coloring fabrics for use in the manufacture of awnings or tents on several accounts: First, the coloring materials, especially the reds, are very much cheaper; second, the colors are not liable to fade; third, much brighter colors and effects can be produced; fourth, cloth which must be exposed to the weather is rendered more durable by being colored in oil, instead of having its durability impaired, as it is by most dyes.

The following are among the peculiarities which distinguish my improved awning-cloth from striped awning-cloth heretofore made, said peculiarities resulting, in part, from the mode in which the color is applied: First, the cloth is striped with oil-color, permeating the body of the fabric with perfect uniformity, resulting in a beautiful transparency in the colored stripes and a positive saving of color, as well as improvement in appearance, by the avoidance of any coating of color on the surface; second, the color shows a perfect uniformity from end to end of the stripes, without "laps" and other inequalities in depth or opacity.

The apparatus and process by which my improved striped cloth is produced are the subject of an application for separate Letters Patent. Said apparatus consists of a sizing-machine, by which the fabric is damped, so as to impart pliability, adapt the surface for the reception of the color, prevent the spreading of the color, and prevent the undue absorption of oil by the fabric, which, besides the injury to its own appearance, would cause the painting-rollers to become coated with pigment. The preliminary damping also causes a uniform shrinkage of the cloth, so that when it is finished and put in use it will not be subject to unequal shrinkage by the effect of wet weather on the uncolored portions.

The accompanying drawing may represent a fragment of striped cloth embodying my invention.

Having thus described my invention, I claim and desire to secure by Letters Patent—

As a new manufacture, an awning or tent cloth striped in oil-color, which permeates the body of the fabric, substantially as set forth.

CHARLES E. WHEELER.

Witnesses:

HENRY A. FOLSOM,
MICHAEL E. SULLIVAN.